(12) United States Patent
Eom et al.

(10) Patent No.: US 10,854,857 B2
(45) Date of Patent: Dec. 1, 2020

(54) SECONDARY BATTERY

(71) Applicant: SAMSUNG SDI CO., LTD., Yongin-si (KR)

(72) Inventors: Hyeri Eom, Yongin-si (KR); Jandee Kim, Yongin-si (KR); Junggyu Nam, Yongin-si (KR); Bongkyoung Park, Yongin-si (KR); Wonkyu Bang, Yongin-si (KR); Junwon Suh, Yongin-si (KR); Juhee Sohn, Yongin-si (KR); Jungyup Yang, Yongin-si (KR); Jeongdoo Yi, Yongin-si (KR); Juhyeong Han, Yongin-si (KR); Hyunhwa Song, Yongin-si (KR); Taesoo Lee, Yongin-si (KR); Sol Choi, Yongin-si (KR); Daun Han, Yongin-si (KR); Seokhun Hong, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 158 days.

(21) Appl. No.: 15/459,281

(22) Filed: Mar. 15, 2017

(65) Prior Publication Data

US 2017/0271628 A1 Sep. 21, 2017

(30) Foreign Application Priority Data

Mar. 15, 2016 (KR) .................. 10-2016-0030945

(51) Int. Cl.
*H01M 2/02* (2006.01)
*H01M 10/04* (2006.01)
*H01M 2/08* (2006.01)
*H01M 2/06* (2006.01)

(52) U.S. Cl.
CPC ........... *H01M 2/0275* (2013.01); *H01M 2/06* (2013.01); *H01M 2/08* (2013.01); *H01M 10/0431* (2013.01)

(58) Field of Classification Search
CPC .. H01M 10/0431; H01M 2/0275; H01M 2/06; H01M 2/08
See application file for complete search history.

(56) References Cited

U.S. PATENT DOCUMENTS

| 8,486,558 B2 | 7/2013 | Kwon et al. | |
| 2011/0014516 A1* | 1/2011 | Roh | H01M 2/0257 429/185 |
| 2013/0101884 A1* | 4/2013 | Ueda | H01M 10/052 429/127 |
| 2013/0122335 A1* | 5/2013 | Park | H01M 2/0212 429/82 |
| 2013/0309546 A1* | 11/2013 | Park | H01M 2/0217 429/120 |
| 2015/0207109 A1* | 7/2015 | Seong | H01M 2/0202 429/185 |
| 2016/0079576 A1* | 3/2016 | Lim | H01M 2/0292 429/176 |

FOREIGN PATENT DOCUMENTS

| KR | 10-2012-0040454 A | 4/2012 |
| KR | 10-2014-0058730 A | 5/2014 |
| KR | 10-2015-0086727 A | 7/2015 |

* cited by examiner

*Primary Examiner* — Adam A Arciero
(74) *Attorney, Agent, or Firm* — Lee IP Law, P.C.

(57) ABSTRACT

A secondary battery including an electrode assembly; a first case that includes an electrode assembly accommodating space; and a second case that coupled to the first case, the second case facing the first case and having a convex-concave pattern.

13 Claims, 8 Drawing Sheets

SECONDARY BATTERY

CROSS-REFERENCE TO RELATED APPLICATION

Korean Patent Application No. 10-2016-0030945, filed on Mar. 15, 2016, in the Korean Intellectual Property Office, and entitled: "Secondary Battery," is incorporated by reference herein in its entirety.

BACKGROUND

1. Field

Embodiments relate to a secondary battery.

2. Description of the Related Art

Demand for using secondary batteries as an energy source has increased according to developed techniques and increased production of mobile devices such as mobile phones and laptop computers. In recent years, secondary batteries have been actively studied and developed to be used in electric vehicles or hybrid vehicles as an alternative energy source that may replace fossil fuels.

Also, demand for producing secondary batteries in a compact size to be preferably used in small electronic devices has increased, and the design of set devices including a secondary battery as a power source has varied to improve their external appearance.

SUMMARY

The embodiments may be realized by providing a secondary battery including an electrode assembly; a first case that includes an electrode assembly accommodating space; and a second case that coupled to the first case, the second case facing the first case and having a convex-concave pattern.

The first case may further include a first seal that surrounds the electrode assembly accommodating space, the first seal being coupled to the facing second case.

The electrode assembly accommodating space may extend away from the first seal and the second case.

The second case may include a cover that faces the electrode assembly accommodating space, and the convex-concave pattern may be in the cover of the second case.

The second case may further include a second seal that surrounds the cover at edges of the cover, the second seal being coupled to the first case.

The convex-concave pattern may extend across the cover to the second seal.

The cover may substantially form a same plane with the second seal.

The convex-concave pattern may substantially form a same plane with the second seal.

The convex-concave pattern may include a stripe pattern that extends in one direction.

The electrode assembly may include electrode terminals that protrude between the first case and the second case, and stripes of the convex-concave pattern may extend in a direction that intersects with a protruding direction of the electrode terminals.

The stripes of the convex-concave pattern may extend in a direction that perpendicularly intersects with the protruding direction of the electrode terminals.

The first case and the second case may each have a pair of short-sides and a pair of long-sides, and stripes of the convex-concave pattern may extend parallel to a direction of the short-sides.

The convex-concave pattern may include a mesh pattern that extends in two different directions.

The first case and the second case may each have a pair of short-sides and a pair of long-sides, the convex-concave pattern includes a first convex-concave pattern that extends parallel to a direction of the short-sides and a second convex-concave pattern that extends parallel to a direction of the long-sides.

The convex-concave pattern may include a plurality of convex parts and a plurality of concave parts that alternate with each other and have different heights from each other; and a plurality of inclination parts that extend at an inclined angle relative to the convex parts and concave parts, each of the inclination parts connecting one of the convex parts and one of the concave parts.

The convex-concave pattern may include a plurality of convex parts and a plurality of concave parts that alternate with each other and have different heights from each other, and the plurality of convex parts and the plurality of concave parts may have rounded edges.

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, a secondary battery according to an exemplary embodiment will be described by referring to the accompanying drawings.

Figure 1:
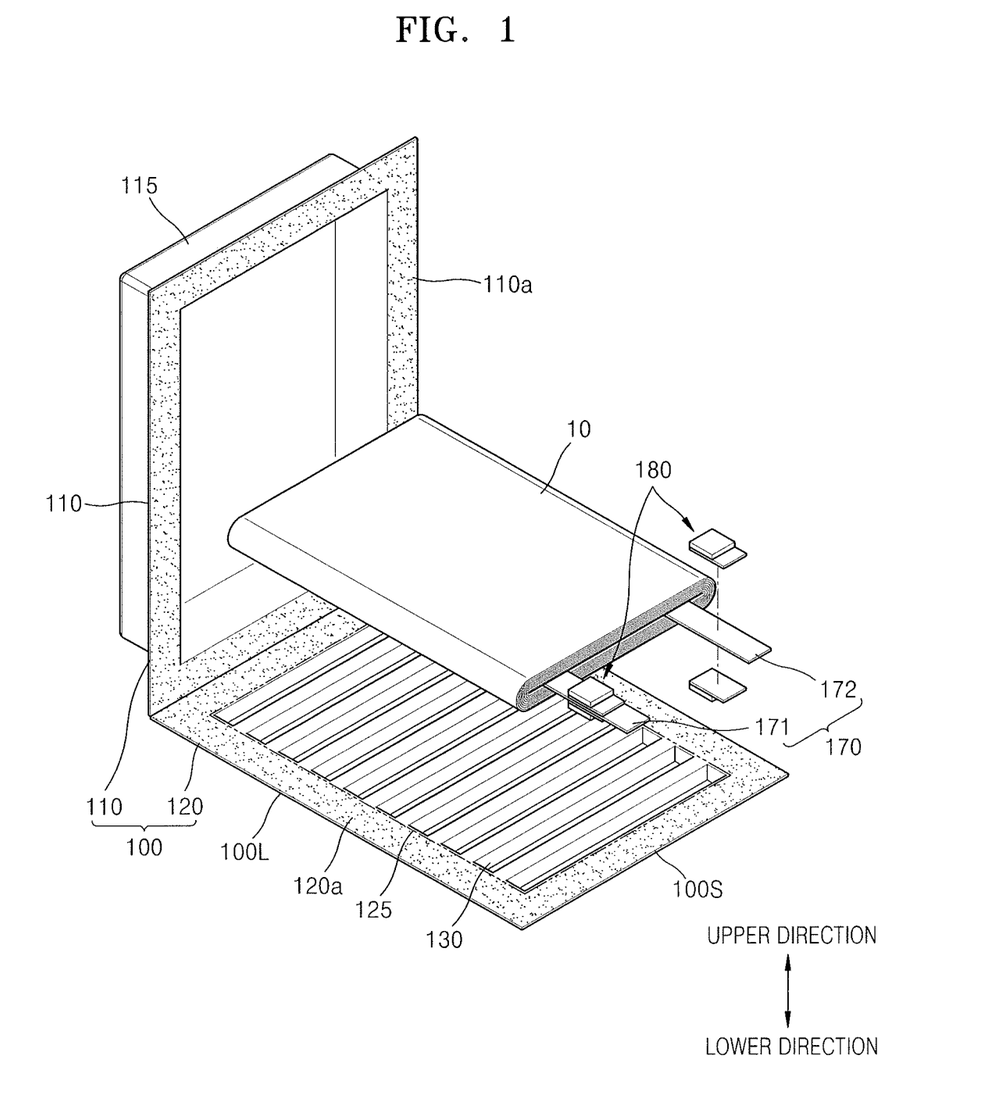
FIG. 1 illustrates an exploded perspective view of a secondary battery according to an embodiment.
Figure 2:
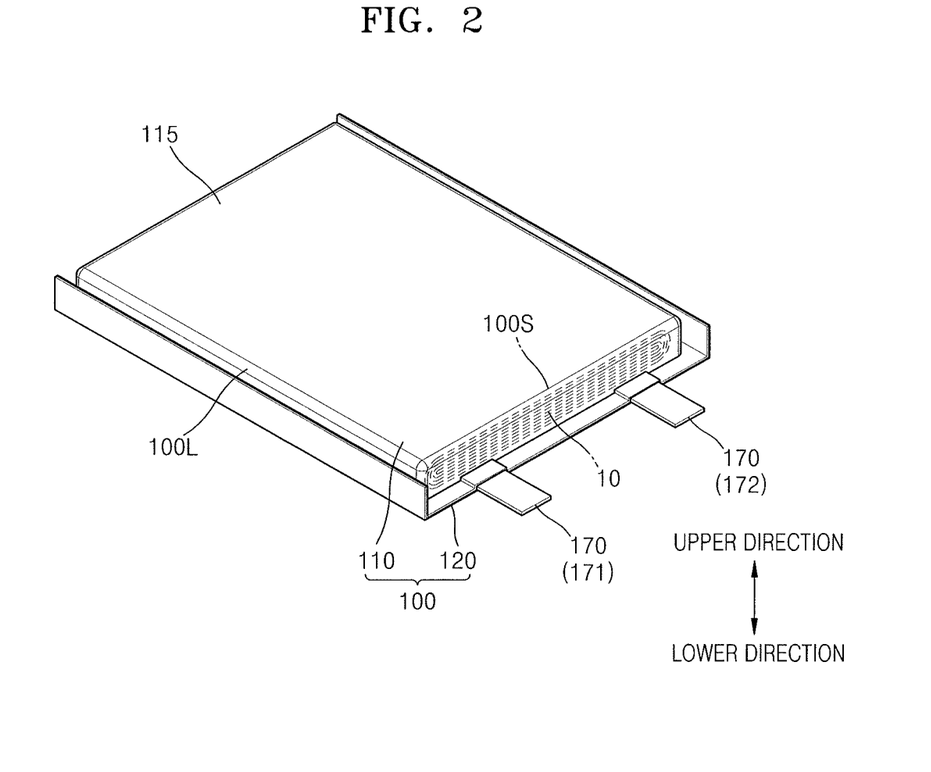
FIGS. 2 and 3 illustrate perspective views of the secondary battery of FIG. 1 from different directions.
Figure 3:
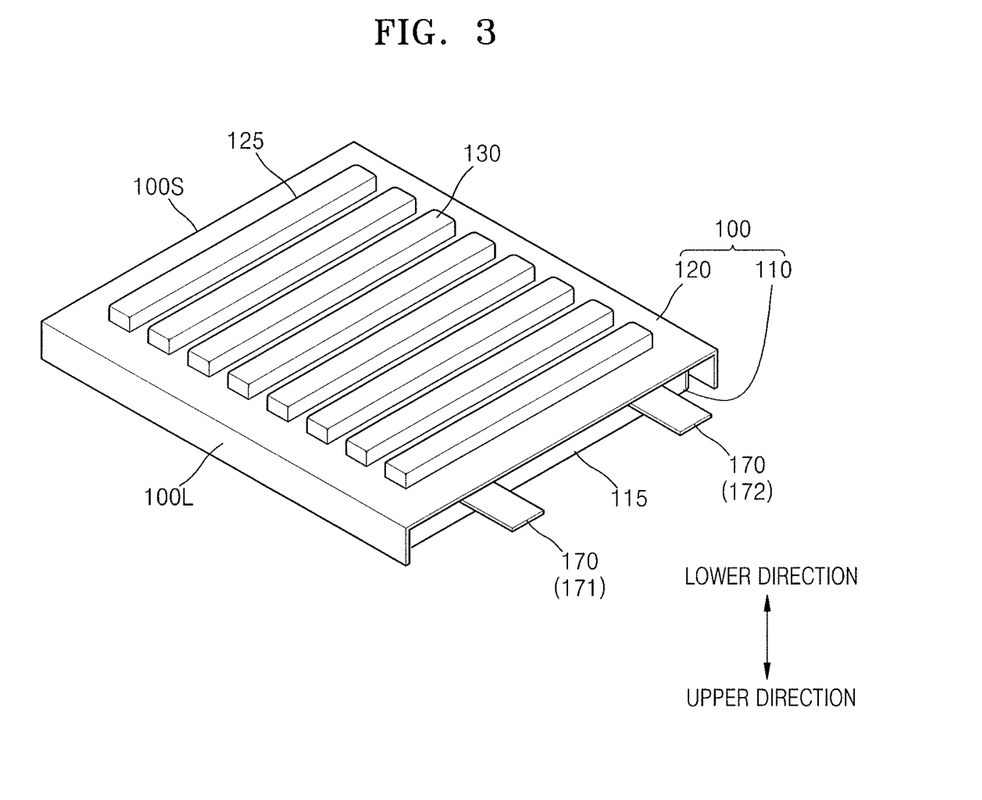
Figure 4:
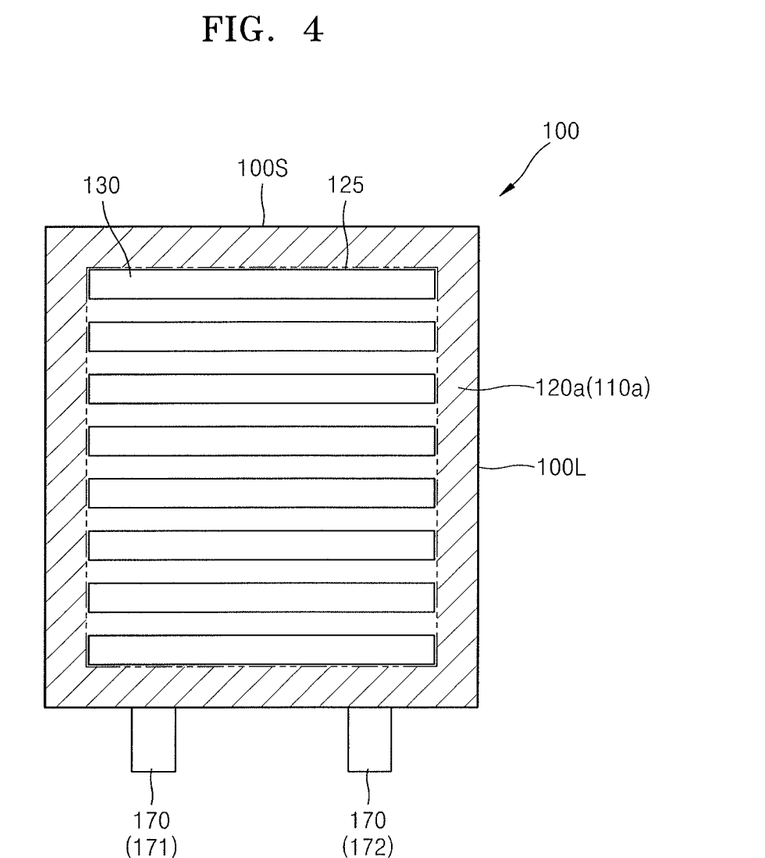
FIG. 4 illustrates a plan view of the secondary battery of FIG. 1.
Figure 5:
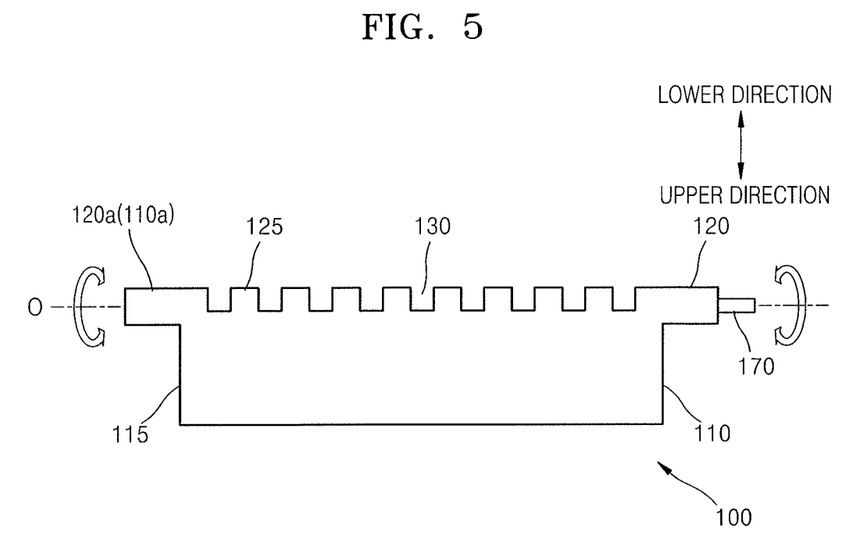
FIG. 5 illustrates a schematic side view of the secondary battery of FIG. 1.

FIG. 1 illustrates an exploded perspective view of a secondary battery according to an embodiment; FIGS. 2 and 3 illustrate perspective views of the secondary battery of FIG. 1 from different directions; FIG. 4 illustrates a plan view of the secondary battery of FIG. 1; and FIG. 5 illustrates a schematic side view of the secondary battery of FIG. 1.

Referring to the drawings, the secondary battery may include an electrode assembly 10 and a case 100 accommodating the electrode assembly 10.

In an implementation, the electrode assembly 10 may be formed as a jelly-roll having a first electrode plate, a second electrode plate of opposite polarities, and a separator between the first electrode plate and the second electrode plate. In an implementation, the electrode assembly 10 may be formed as a stack type electrode assembly having a first electrode plate having a sheet-like shape, a second electrode plate having a sheet-like shape, and a separator between the first electrode plate and the second electrode plate, where a plurality of the first electrode plates and the second electrode plates are stacked therein.

The electrode assembly 10 may include first and second electrode terminals 171 and 172 protruding from the first and second electrode plates to form paths of charge/discharge currents. A sealing member 180 may be formed on each of the first and second electrode terminals 171 and 172. The sealing member 180 may be formed on an upper surface and a lower surface of each of the first and second electrode terminals 171 and 172 and may help secure electric insulation between electrode terminals 170 and the case 100, and may seal the periphery of the electrode terminals 170 together with the case 100. The first and second electrode terminals 171 and 172 may protrude through first and second cases 110 and 120 to the outside of the case 100 and may form paths of charge/discharge currents. In the present specification, the electrode terminals 170 may denote both the first and second electrode terminals 171 and 172 having opposite polarities or may denote one of the first and second electrode terminals 171 and 172. As described below, a convex-concave pattern 130 may be formed on the second case 120, and the convex-concave pattern 130 may extend as a stripe in a direction different from a protruding direction of the electrode terminals 170. Here, the protruding direction of the electrode terminals 170 may denote a protruding direction of at least one selected from the first and second electrode terminals 171 and 172.

The case 100 may include the first and second cases 110 and 120 that are assembled (with the electrode assembly 10 disposed therebetween) in directions facing each other. For example, the case 100 may include the first case 110 that includes an electrode assembly accommodating space 115; and the second case 120 that attaches to the first case 110 to seal the electrode assembly 10. The first case 110 may have a shape having a depth to provide the electrode assembly accommodating space 115. For example, the first case 110 may have a concave shape formed by the electrode assembly accommodating space 115 by applying a deep drawing process to a raw material plate. First and second seals 110a and 120a may be formed on facing surfaces of the first and second cases 110 and 120 facing each other, respectively. The electrode assembly 10 may be disposed between the first and second cases 110 and 120, and the first and second seals 110a and 120a may be thermally pressed, thereby sealing the electrode assembly 10.

The convex-concave pattern 130 may be formed in the second case 120. The convex-concave pattern 130 may be formed as a stripe pattern that extends in one direction. For example, the convex-concave pattern 130 having a plurality of stripe patterns extending in one direction may be formed in a main surface of the second case 120. Here, the term "main surface" may refer to a surface that occupies the largest surface area of the second case 120 or may refer to both an upper surface and a lower surface of the whole case 100 having a hexahedron shape including the first and second cases 110 and 120.

The convex-concave pattern 130 may refer to prominence-depression patterns (e.g., corrugated patterns or a series of alternating peaks and valleys). For example, the prominence-depression patterns may alternate with each other and may include a plurality of convex parts and a plurality of concave parts having different heights with respect to each other. When the convex-concave pattern 130 is formed in the second case 120, a shape of the second case 120 may be flexibly deformed. For example, a shape of the second case 120 may be easily deformed according to external force through the convex-concave pattern 130. The convex-concave pattern 130 may facilitate flexible deformation of the shape of the whole secondary battery, and thus may provide a structure for a flexible secondary battery used in circumstances that require bending of the secondary battery into a shape of a circular arc according to a spatial restriction of a set device, in which the secondary battery becomes the power source, or to shape characteristics of the set device itself.

The convex-concave pattern 130 may be formed or extend in a direction different from the protruding direction of the electrode terminals 170. For example, the convex-concave pattern 130 may be formed or extend in a direction that intersects with the protruding direction of the electrode terminals 170. In an implementation, the convex-concave pattern 130 may be formed or extend in a direction that perpendicularly intersects with the protruding direction of the electrode terminals 170. For example, when the convex-concave pattern 130 is formed as a stripe pattern, the stripes of the convex-concave pattern 130 may extend in a direction perpendicular to the protruding direction of the electrode terminals 170.

The secondary battery may include a pair of long-sides 100L that extend relatively long and a pair of short-sides 100S that extend relatively short (as compared with the long sides 100L). For example, the electrode terminals 170 may protrude in a direction parallel to the long-sides 100L, and the convex-concave pattern 130 may extend in a direction parallel to the short-sides 100S. When the convex-concave pattern 130 extends in the direction parallel to the short-sides 100S, the convex-concave pattern 130 may be smoothly bent in response to a bending moment for bending the long-sides 100L. For example, the convex-concave pattern 130 may be formed or extend in a direction of the short-sides 100S of the case 100 to provide a flexible secondary battery that is required to have bending deformation by bending the long-sides 100L of the secondary battery.

For example, the bending deformation by bending the long-sides 100L of the secondary battery may be adapted to a more severe bending requirement than bending deformation by bending the short-sides 100S. For example, in terms of a degree of the whole bending deformation, a structure, in which the long-sides 100L that extend relatively long are bent, may accept more bending deformation than a structure, in which the short-sides 100S that extend relatively short are bent.

The first case 110 may include the electrode assembly accommodating space 115 having a depth to accommodate the electrode assembly 10; and the first seal 110a that surrounds edges of the electrode assembly accommodating space 115. For example, the electrode assembly accommodating space 115 may be formed with a depth from the first seal 110a opposite to the second case 120 (e.g., the electrode assembly accommodating space 115 may extend away from the second case 120 such that the electrode assembly accommodating space 115 has a concavity that is open toward the second case 120).

The second case 120 may include a cover 125 facing the electrode assembly accommodating space 115; and the second seal 120a that surrounds edges of the cover 125. The second case 120 may have a shape of a plate, e.g., that substantially forms the same or a continuous surface. For example, the cover 125 may substantially form the same or continuous surface with the second seal 120a. As described below, the convex-concave pattern 130 may be formed in the cover 125, and the convex-concave pattern 130 or the cover 125 having the convex-concave pattern 130 formed therein may substantially form the same or continuous surface with the second sealing part 120a.

The first and second cases 110 and 120 may be coupled facing each other with the electrode assembly 10 disposed therebetween, and the first and second seals 110a and 120a contacting each other may be thermally pressed to each other, thereby sealing the electrode assembly 10. The convex-concave pattern 130 may be substantially formed on the same or continuous surface with the first and second seals 110a and 120a from a perspective of the first and second seals 110a and 120a contacting each other and thermally pressed. The electrode assembly accommodating space 115 may be formed with a depth and may extend away from the first and second seals 110a and 120a and at a position distance apart from the first and second seals 110a and 120a.

The electrode assembly accommodating space 115 of the first case 110 and the cover 125 of the second case 120 may face each other. The cover 125 may cover the electrode assembly accommodating space 115 of the first case 110 to seal the electrode assembly 10. In an implementation, the convex-concave pattern 130 may be formed in the cover 125.

In an implementation, the convex-concave pattern 130 may be formed on the entire main surface of the second case 120 or may be limited to the cover 125 and not on the second seal 120a. The second seal 120a may be thermally pressed with the first seal 110a to seal the electrode assembly 10, and thus the first and second seals 110a and 120a may be adhered to each other into a flat shape. For example, when the first and second seals 110a and 120a are formed into a flat shape, convenience in a thermal pressing process may improve, and sealing characteristics of the first and second seals 110a and 120a may improve.

In an implementation, the electrode assembly accommodating space 115 may be formed in the first case 110, and the convex-concave pattern 130 may be formed in the second case 120. For example, in one embodiment, the electrode assembly accommodating space 115 and the convex-concave pattern 130 may be located at or face opposite positions. For example, when the electrode assembly accommodating space 115 is formed in one of the first and second cases 110 and 120, the convex-concave pattern 130 is formed in the other, and thus the electrode assembly accommodating space 115 and the convex-concave pattern 130 may not be formed together in the first case 110 or in the second case 120. Details will be provided below.

Figure 6:
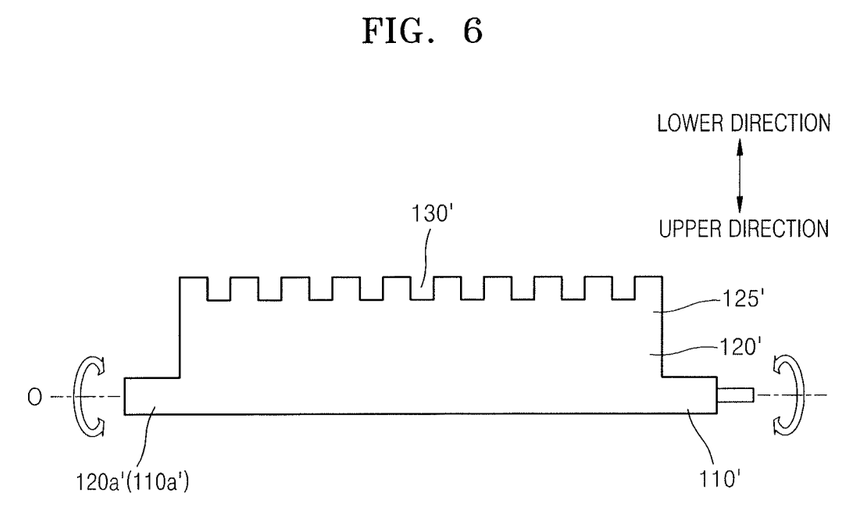
FIG. 6 illustrates a schematic side view of a secondary battery according to a Comparative Example.

FIG. 6 illustrates a secondary battery according to a Comparative Example for comparison.

Referring to FIG. 6, the secondary battery may include an electrode assembly; and a case for accommodating the electrode assembly. The case may include a first case 110' and a second case 120' that are configured to be assembled facing each other. Here, an electrode assembly accommodating space 125' and a convex-concave pattern 130' may be formed together in the second case 120'. In this case, when the electrode assembly accommodating space 125' and the convex-concave pattern 130' are formed together in one case, e.g., the second case 120', the convex-concave pattern 130' may be destroyed or cracks could occur in the convex-concave pattern 130' during bending deformation of the secondary battery. For example, that the convex-concave pattern 130' may be destroyed may denote that the convex-concave pattern 130' may be crushed or torn instead of the second case 120' being smoothly bent in response to the external force.

For example, a patterning process for forming the convex-concave pattern 130' may overlap a deep drawing process for providing the electrode assembly accommodating space 125' that has been applied to the second case 120'. When such two different processes are applied to the same locations, e.g., a main surface of the second case 120', mechanical characteristics of the second case 120' could deteriorate, and, e.g., cracks may occur during the bending deformation or the convex-concave pattern 130' may be destroyed as the fragility of the second case 120' increases. For example, when ductility decreases and fragility increases in the second case 120' due to the overlapped processes, cracks may occur according to stress concentration at a hardened region, or the convex-concave pattern 130' may be crushed or torn into a random shape as the deformation is concentrated at a particular region.

When the electrode assembly accommodating space 125' is formed in the second case 120', the main surface of the second case 120' may have a significant height difference from first and second seals 110a' and 120a' (a central axis O). Here, from a perspective of the first and second seals 110a' and 120a' that form the longest length of a case 100, more deformation may be required for the convex-concave pattern 130' with respect to the same bending deformation. That is because the main surface of the second case 120' may have a significant height difference from the first and second sealing parts 110a' and 120a', and the main surface of the second case 120' may undergo a high degree of deformation in response to the same bending deformation.

According to an embodiment shown in FIG. 5, the electrode assembly accommodating space 115 may be formed in the first case, and the convex-concave pattern 130 may be formed in the second case 120. In this regard, the electrode assembly accommodating space 115 and the convex-concave pattern 130 may be formed opposite to one another in the first and second cases 110 and 120, respectively, a deep drawing process for forming the electrode assembly accommodating space 115 and a patterning process for forming the convex-concave pattern 130 may not overlap in their application to any one of the first and second cases 110 and 120. Thus, deterioration of mechanical characteristics of the first and second cases 110 and 120 may be prevented. For example, an increase in fragility of the first and second cases 110 and 120 may be suppressed, and ductility of the first and second cases 110 and 120 may be maintained.

When the electrode assembly accommodating space 115 is formed in the first case 110, a main surface of the first case 110 may have a significant height difference from first and second seals 110a and 120a (a central axis O). Here, from a perspective of the first and second seals 110a and 120a that form the longest length of a case 100, more deformation may be required for the main surface of the first case 110 with respect to the same bending deformation. That is because the main surface of the first case 110 may have a significant height difference from the first and second seals 110a and 120a, and the main surface of the first case 110 may undergo a high degree of deformation in response to the same bending deformation.

Unlike the first case 110, a main surface of the second case 120 may form almost the same or continuous surface (e.g., flat surface) from the perspective of the first and second seals 110a and 120a. For example, the main surface of the second case 120 and the first and second seals 110a and 120a may have almost no height difference (e.g., compared with the height different of the first case 110). Here, from the perspective of the first and second seals 110a and 120a that form the longest length of the case 100, a degree of deformation required for the convex-concave pattern 130 with respect to the same bending deformation may be significantly reduced, compared to that of the Comparative Example in FIG. 6. This is because the main surface of the second case 120 may have almost no height difference with those of the first and second seals 110a and 120a, which may result in a decrease in the degree of deformation the main surface of the second case 120 undergoes with respect to the same bending deformation.

Figure 7:
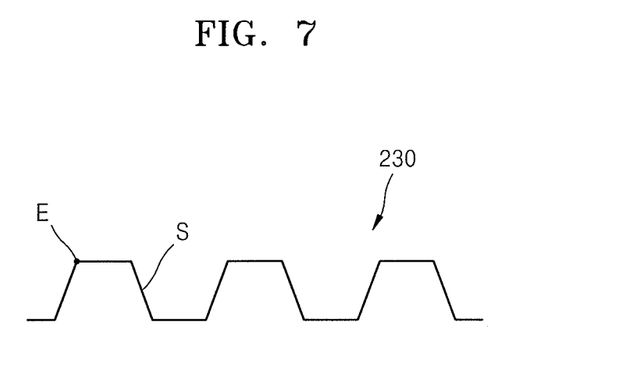
FIGS. 7 and 8 illustrate schematic views of a structure of convex-concave patterns applicable in other embodiments.
Figure 8:
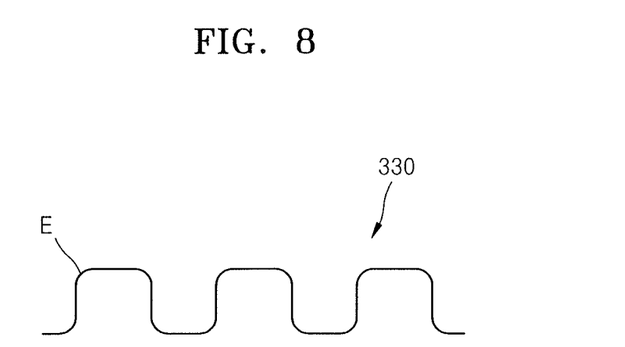

FIGS. 7 and 8 illustrate enlarged views of various convex-concave patterns 230 and 330 that may be applied to the embodiments.

Referring to FIGS. 7 and 8, the convex-concave patterns 230 and 330 may be each alternately disposed or may each include a plurality of convex parts and a plurality of concave parts having different heights in a vertical direction. As shown in FIG. 7, the convex-concave pattern 230 may include an inclination part S that extends with a slope in a vertical direction. For example, the convex-concave pattern 230 may be alternately disposed and may include the inclination part S that connects the convex parts and concave parts having different heights from each other at an inclined angle. For example, the convex parts may be one surface and the concave parts may be another surface that is parallel with but on a different plane relative to the convex parts. The convex-concave pattern 230 may include the inclination part S to help reduce stress concentration on edges E of the convex-concave pattern 230. For example, the convex-concave pattern 230 may be formed by a press process performed on a flat raw material. Here, the convex-concave pattern 230 may include the inclination part S with a gentle slope to help reduce stress concentration on edges E of the convex-concave pattern 230. The stress concentration accumulated during the molding of the convex-concave pattern 230 could cause fragility destruction during bending deformation, and a convex-concave pattern having a gentle slope may be designed to include the inclination part S for reducing the stress concentration at the edges E of the convex-concave pattern 230 during the molding.

As shown in FIG. 8, the convex-concave pattern 330 may include edges E having a rounded shape. For example, the convex-concave pattern 330 may include a plurality of convex parts and a plurality of concave parts that are alternately disposed and have different heights in a vertical direction, and the convex parts and the concave parts may include rounded edges E. The rounded edges E may help reduce stress concentration on the edges E during the molding of the convex-concave patterns 330 and may help prevent destruction or collapse of the convex-concave patterns 330 according to stress concentration during the bending deformation.

Figure 9:
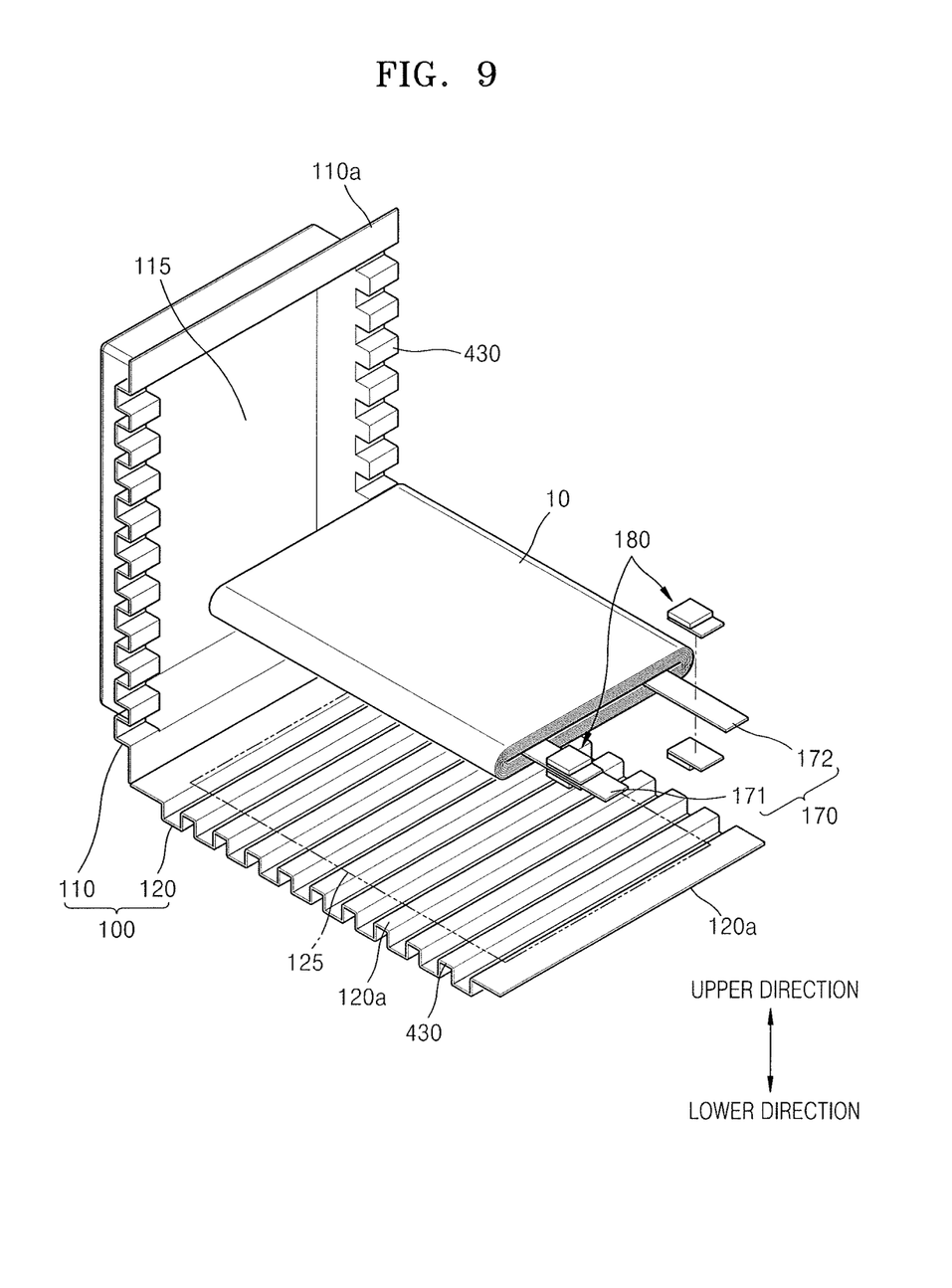
FIG. 9 illustrates an exploded perspective view of a secondary battery according to another embodiment.

FIG. 9 illustrates an exploded perspective view of a secondary battery according to another embodiment. Referring to FIG. 9, the secondary battery may include first and second cases 110 and 120 facing each other with an electrode assembly 10 disposed therebetween.

The first case 110 may include an electrode assembly accommodating space 115; and a first seal 110a that surrounds edges of the electrode assembly accommodating space 115. The second case 120 may include a cover 125 facing the electrode assembly accommodating space 115 and a second seal 120a that surrounds edges of the cover 125.

A convex-concave pattern 430 may be formed in the second case 120. The convex-concave pattern 430 may be formed in the second case 120 that is opposite from the first case 110 and not the first case 110 having the electrode assembly accommodating space 115 having a depth for accommodating the electrode assembly 10. The convex-concave pattern 430 may be formed in a main surface of the second case 120. For example, the convex-concave pattern 430 may extend to the second seal 120a across the cover 125 of the second case 120. For example, the convex-concave pattern 430 may be substantially formed throughout or across the whole second case 120.

The convex-concave pattern 430 may be formed in the first seal 110a (that is to be thermally pressed with the second seal 120a). For example, when the first and second seals 110a and 120a include the convex-concave pattern 430 that conform with each other, the first and second seals 110a and 120a may be adhered to each other, and the first and second seals 110a and 120a may not separate from each other. In this regard, the electrode assembly 10 accommodated therein may be safely protected. For example, when the first and second seals 110a and 120a include the convex-concave pattern 430 that conform with each other, sealing of the electrode assembly 10 may be secured.

Figure 10:
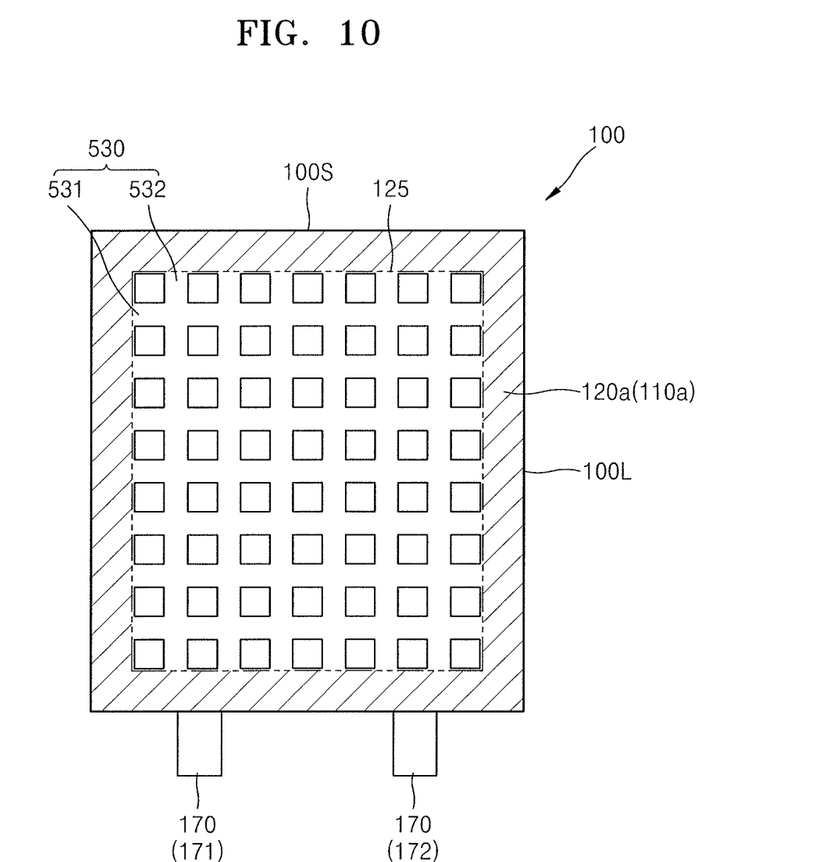
FIG. 10 illustrates a plan view of a secondary battery according to another embodiment.

FIG. 10 illustrates a plan view of a secondary battery according to another embodiment.

Referring to FIG. 10, the secondary battery may have a convex-concave pattern 530 of a mesh pattern that extends in two different directions. When a case 100 includes a pair of short-sides 100S that face each other and a pair of long-sides 100L that face each other, the convex-concave pattern 530 may include a first convex-concave pattern 531 that extends parallel to the short-sides 100S and a second convex-concave pattern 532 that extends parallel to the long-sides 100L. For example, the first convex-concave pattern 531 and the second convex-concave pattern 532 may extend in directions different from each other. In an implementation, the first convex-concave pattern 531 and the second convex-concave pattern 532 may extend in directions that are perpendicular to each other. Regarding the extension directions of the first and second convex-concave patterns 531 and 532, the first convex-concave pattern 531 may extend in a direction perpendicular to a protruding direction of electrode terminals 170, and the second convex-concave pattern 532 may extend in a direction parallel to the protruding direction of electrode terminals 170.

When the convex-concave patterns 530 extend in two different directions, the case 100 including the convex-concave patterns 530 may be flexibly deformed with respect to bending deformation in the two different directions. For example, the secondary battery may be bend-deformed along the two different directions according to a shape of a set device having the secondary battery as a driving source.

Here, the first and second convex-concave patterns 531 and 532 formed in two different directions may be bend-deformed in various shapes, and thus a structure suitable for a flexible secondary battery may be provided.

The convex-concave pattern 530 may be formed in a main surface of the case 100. For example, the convex-concave pattern 530 may be formed in a cover 125 surrounded by first and second seals 110a and 120a. In an implementation, the convex-concave pattern 530 may be formed throughout the whole main surface of the case 100 including the cover 125 and the first and second seals 110a and 120a.

According to one or more embodiments, provided is a flexible secondary battery that may be flexibly deformed. When the secondary battery that may be flexibly deformed in response to bending deformation according to a shape of a set device, a degree of design freedom of the set device may increase. When a mounting space of the secondary battery is freely designed, custom satisfaction with appearance of the set device may increase, and the whole set device may be further intensively designed.

According to one or more embodiments, when a convex-concave pattern is applied to provide a secondary battery that may be flexibly deformed. For example, according to one or more embodiments, a secondary battery having a high durability may be prevented from collapse of the convex-concave pattern or fragility destruction according to bending deformation while applying the convex-concave pattern.

The embodiments may provide a flexible secondary battery that may be flexibly deformed.

The embodiments may provide a secondary battery that is flexible and highly durable.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
an electrode assembly;
a first case that includes an electrode assembly accommodating space; and
a second case that is coupled to the first case, the second case facing the first case and having a convex-concave pattern that is sealed when the second case is secured to the first case,
wherein:
the first case further includes a first seal that surrounds the electrode assembly accommodating space, the electrode assembly accommodating space extending away from the first seal and the second case,
the second case further includes a second seal that surrounds a central region of the second case, the central region facing the electrode assembly accommodating space and the second seal including a flat surface that is coplanar with a flat portion of the central region of the second case such that the flat portion of the central region forms a continuous surface with the second seal, the first seal is coupled with the second seal, and the convex-concave pattern is in the central region of the second case.

2. The secondary battery as claimed in claim 1, wherein the convex-concave pattern extends across the central region to the second seal.

3. The secondary battery as claimed in claim 1, wherein the convex-concave pattern includes a stripe pattern that extends in one direction.

4. The secondary battery as claimed in claim 3, wherein:
the electrode assembly includes electrode terminals that protrude between the first case and the second case, and
stripes of the convex-concave pattern extend in a direction that intersects with a protruding direction of the electrode terminals.

5. The secondary battery as claimed in claim 4, wherein the stripes of the convex-concave pattern extend in a direction that perpendicularly intersects with the protruding direction of the electrode terminals.

6. The secondary battery as claimed in claim 3, wherein:
the first case and the second case each have a pair of short-sides and a pair of long-sides, and
stripes of the convex-concave pattern extend parallel to a direction of the short-sides.

7. The secondary battery as claimed in claim 1, wherein the convex-concave pattern includes a mesh pattern that extends in two different directions.

8. The secondary battery as claimed in claim 7, wherein:
the first case and the second case each have a pair of short-sides and a pair of long-sides, and
the convex-concave pattern includes a first convex-concave pattern that extends parallel to a direction of the short-sides and a second convex-concave pattern that extends parallel to a direction of the long-sides.

9. The secondary battery as claimed in claim 1, wherein the convex-concave pattern includes a plurality of convex parts and a plurality of concave parts that alternate with each other and such that the plurality of convex parts have different heights from the plurality of concave parts; and a plurality of inclination parts that extend at an inclined angle relative to the convex parts and concave parts, each of the inclination parts connecting one of the convex parts and one of the concave parts.

10. The secondary battery as claimed in claim 1, wherein:
the convex-concave pattern includes a plurality of convex parts and a plurality of concave parts that alternate with each other and have different heights from each other, and
the plurality of convex parts and the plurality of concave parts have rounded edges.

11. The secondary battery as claimed in claim 3, wherein the second case is flexible about an axis extending in the one direction.

12. The secondary battery as claimed in claim 1, wherein the second case does not include an electrode assembly accommodating space.

13. The secondary battery as claimed in claim 1, wherein the convex-concave pattern includes a series of alternating peaks and valleys in which the peaks include the flat surfaces that are coplanar with the flat surface of the seal.

* * * * *